INVENTORS
Howard A. Alexanderson
Harold A. Wheeler
BY Herbert L. Davis, Jr.
ATTORNEY

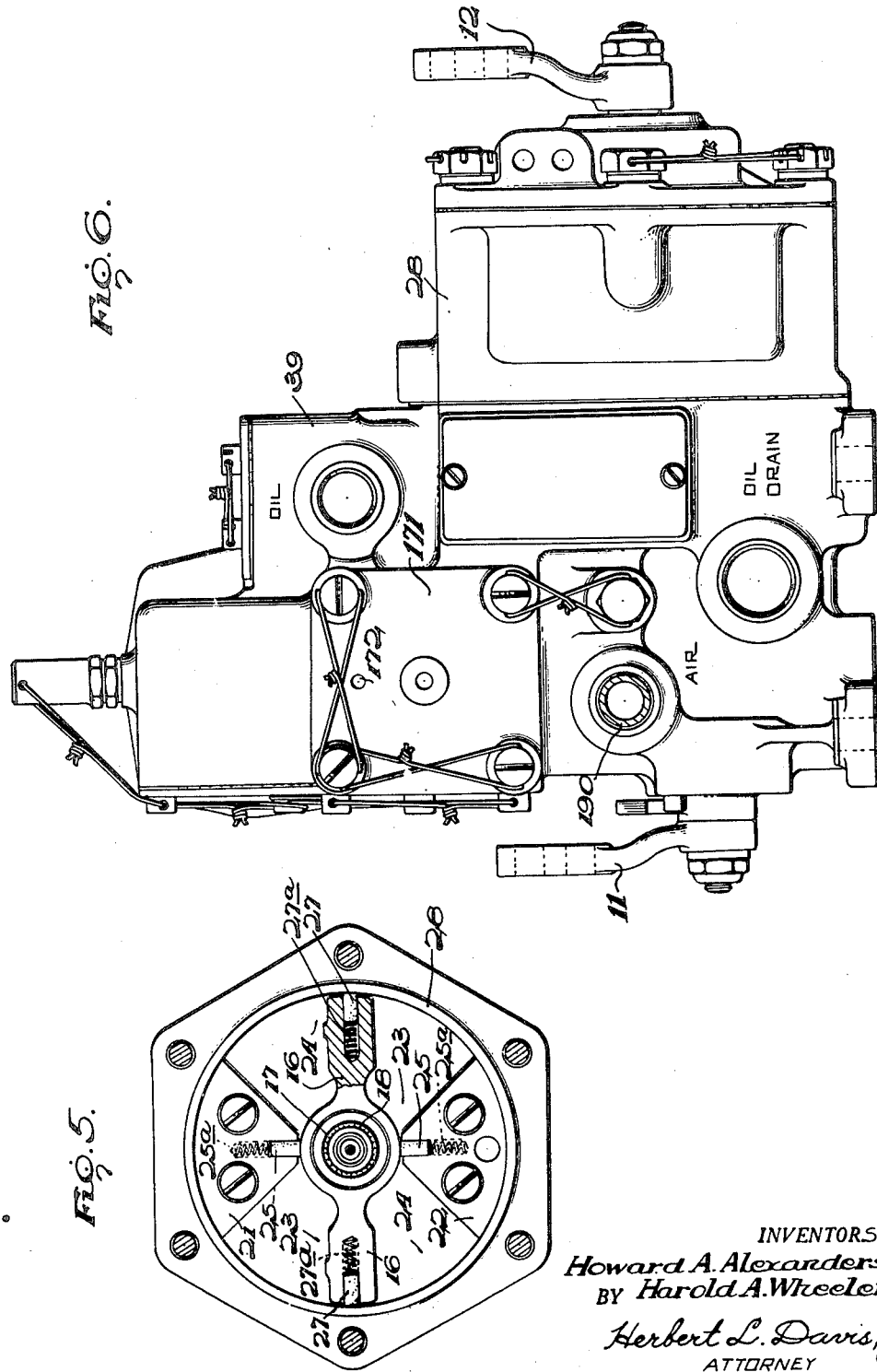

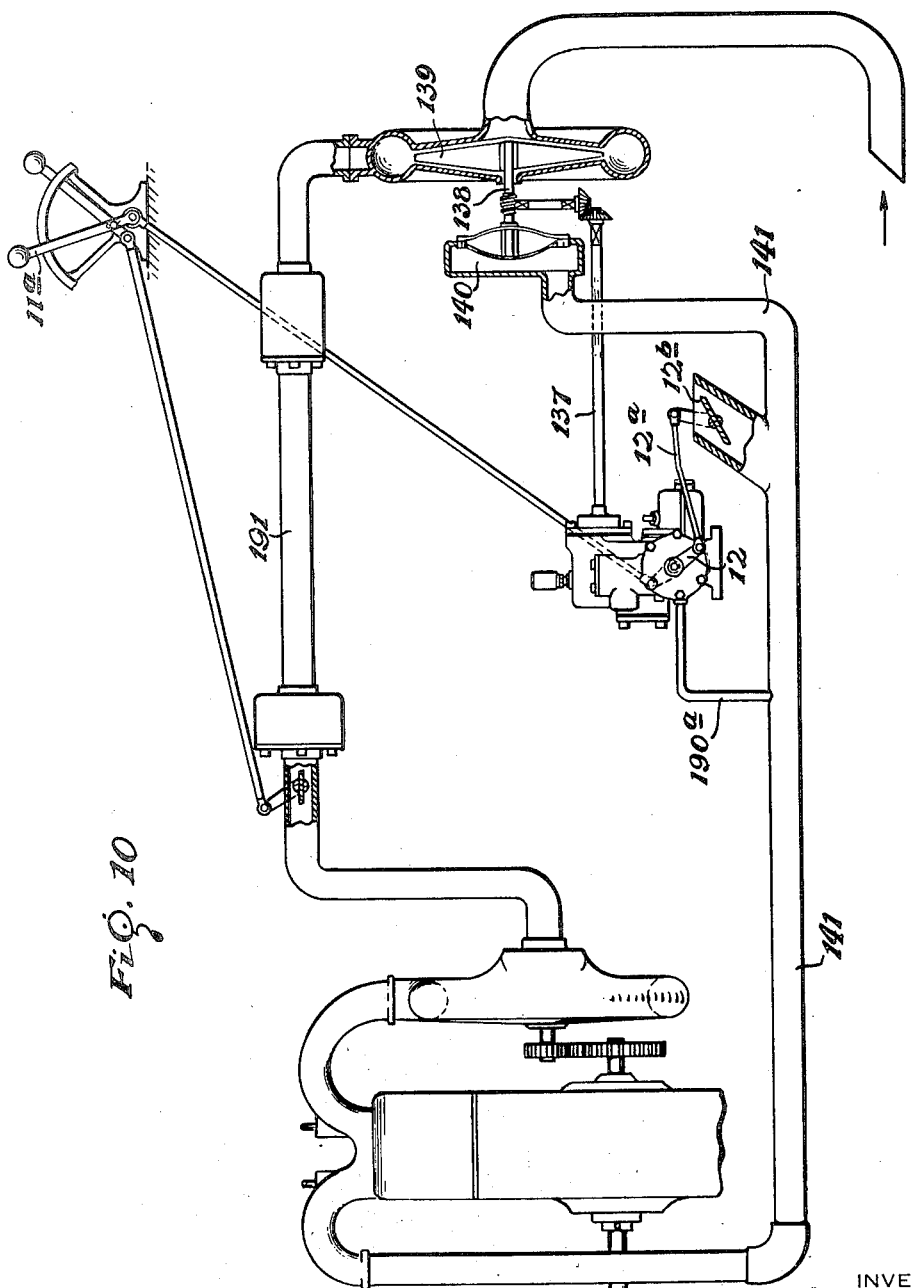

Patented Jan. 24, 1950

2,495,564

UNITED STATES PATENT OFFICE 2,495,564

CONTROL MECHANISM FOR AIRCRAFT ENGINES AND SUPERCHARGERS

Howard A. Alexanderson, Wood Ridge, and Harold A. Wheeler, Alwood, N. J., assignors to Bendix Aviation Corporation, Teterboro, N. J., a corporation of Delaware Application October 7, 1944, Serial No. 557,672

16 Claims. (Cl. 230—5)

The present application pertains to improvements in the control means disclosed in the co-pending application Serial No. 550,646 of Howard A. Alexanderson filed August 22, 1944, now Patent No. 2,453,650, dated November 9, 1948, and relates to internal combustion engine controls and more particularly to novel regulator means for governing the air supplied to the combustion chambers of the engine.

An object of the invention is to provide a novel regulating device for an aircraft engine.

Another object of the invention is to provide a novel linkage arrangement and mechanical assembly for a regulating device.

Another object of the invention is to provide novel means for controlling the operation of an exhaust driven turbine supercharger, including means for maintaining a minimum operation of the same. In certain types of superchargers as is well known in the art the turbine driven supercharger serves the additional function of supplying air for cooling certain portions of the turbine bearings. Thus if the operation of the supercharger be terminated, while the engine is in operation, overheating of the portions cooled by the supercharger would result due to the high temperatures of the exhaust gases.

Another object of the invention is to provide novel means for regulating the intake pressure of an aircraft engine including means for regulating the operation of an exhaust driven supercharger so as to maintain differential pressure above atmospheric pressure regardless of the selected intake pressure, and thereby assure operation of the supercharger during the operation of the aircraft engine.

Another object of the invention is to provide a novel low boost lockout arrangement for preventing the minimum differential control from effecting an increased operation of the supercharger, when the manually operable pressure selecting means is positioned within a predetermined minimum pressure range.

Another object of the invention is to provide in addition to the aforenoted minimum range and normal control, novel governor means for preventing the supercharger from overspeeding.

Another object of the invention is to provide novel mechanical means for interconnecting the several control means previously noted in a compact assemblage.

These and other objects of the invention will become apparent from inspection of the following specification when read with reference to the accompanying drawings wherein is illustrated the preferred embodiment of the invention. It is to be expressly understood, however, that the drawings are for the purpose of illustration only, and are not designed as a definition of the limits of the invention, reference being had to the appended claims for this purpose.

In the drawings, wherein like reference numerals refer to like parts throughout the several views:

Figure 5 is a fragmentary sectional view of Figure 1 taken along the lines 5—5.

Figure 6 is a view in elevation of the opposite side of the device from that shown in Figure 1.

Figure 10 is a schematic view illustrating the the form of the invention shown in Figure 1 applied as a supercharger regulator and responsive to the exhaust pressure from the aircraft engine.

Figure 7:
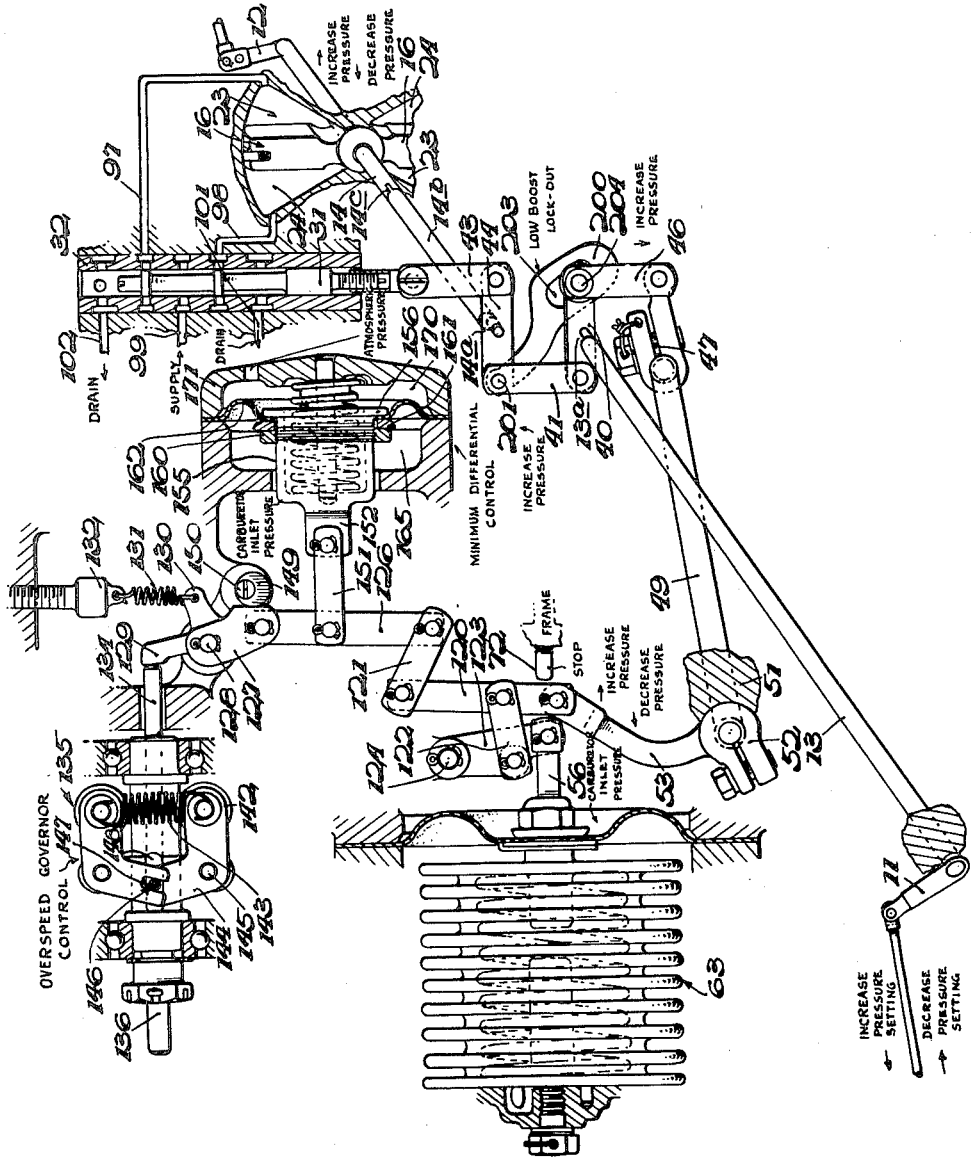
Figure 7 is a schematic view illustrating the operating linkage arrangement of the form of the invention shown in Figure 1.
Figure 8:
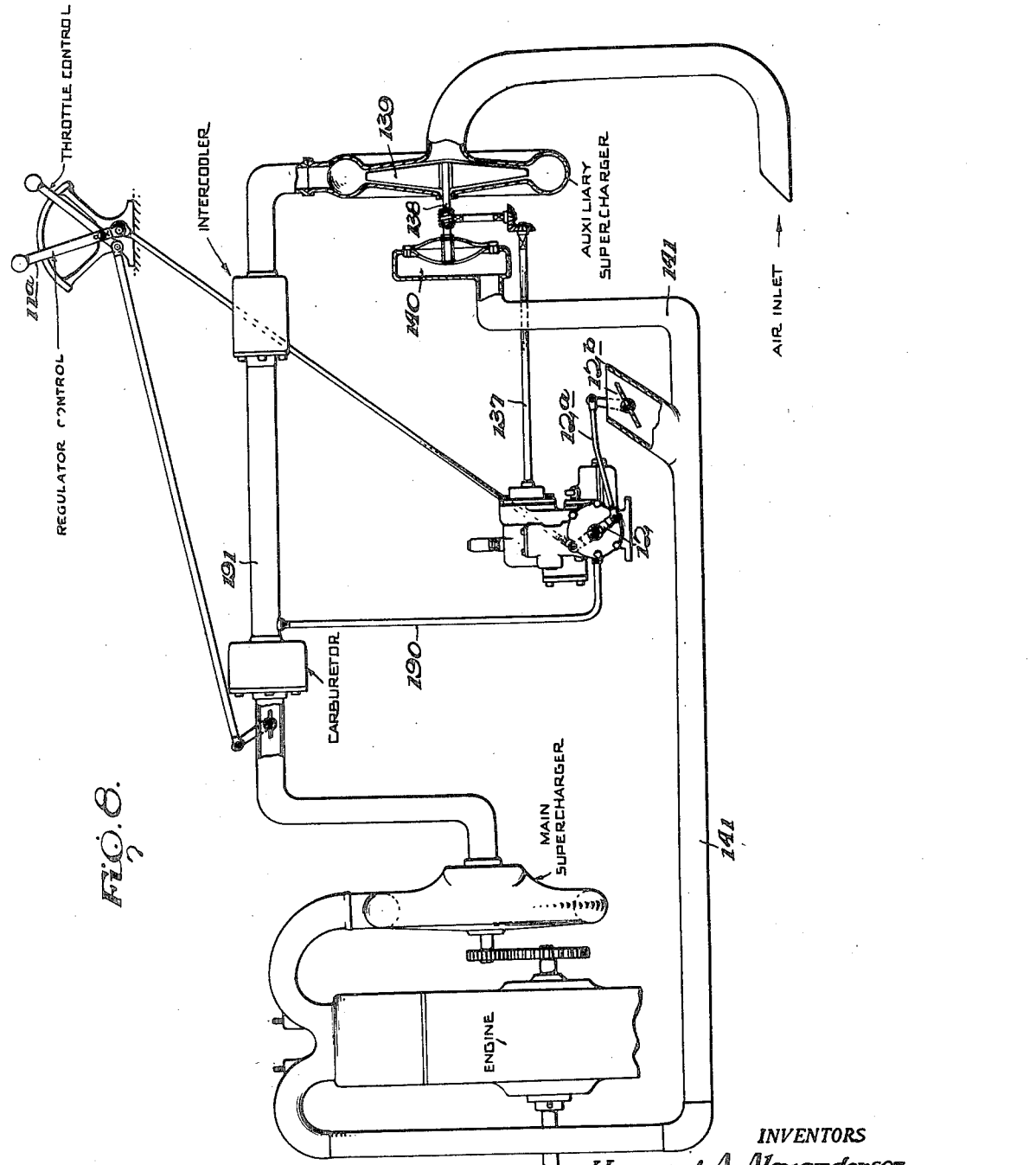
Figure 8 is a schematic view illustrating the form of the invention shown in Figure 1 applied as a supercharger regulator.

Referring first to Figures 1 through 7 reference characters 11 and 12 designate levers having an operative connection with shafts 13 and 14 respectively; the lever 11 being adapted for manual operation by means of a pilot's control lever 11a in a manner such as shown in Figure 8 and the lever 12 may be operatively connected by a link 12a to waste gate 12b of a supercharger as shown in Figure 8.

The shaft 14 (and therefore the lever 12) is adapted to be swung in both directions to produce a corresponding shifting of the element controlled thereby in response to automatic shifting of a servo element 16. The servo element 16 has provided a hub portion 17 (Figure 5) internally splined or serrated to engage corresponding splines or serrations 18 on the central portion of the shaft 14. The servo element 16 is shown in Figures 5 and 7 as in the form of a vane, movable between two radial abutments 21 and 22 in response to the admission and exhaust of fluid pressure to the sector shaped chambers 23 and 24 which are formed at opposite sides of the vane 16 by abutments 21 and 22 on the one hand, and vane 16 on the other. The vane 16 has blades 27 slidably mounted therein and forced under tension of springs 27a so as to fit snugly against the inner cylindrical surface of the housing member 28. Similar blades 25 mounted in the abutments 21 and 22 are biased under tension of springs 25a into contacting relation with hub 17 so as to seal the oppositely disposed chambers 23 and 24. The means for controlling the alternate supply to, and exhaust from, the chambers 23 and 24 is shown as including a valve assembly consisting of a central movable plunger portion 31 (see Figures 3 and 7), and fixedly mounted sleeve 32.

The valve assembly is housed in a central portion 38 which extends upwardly from the main housing 39 of the device, and is located directly above the operating linkage connecting the manually operable shaft 13 with the valve 31. As probably best shown in Figures 3 and 7, the latter connecting means includes a pin portion 13a provided at the inner end of the shaft 13 and positioned in eccentric relation to the axis of rotation of the shaft 13.

Fulcrumed on the eccentric pin portion 13a is a lever 40 which is operably connected at one end by linkage members 41 to one end of a second lever 44. The lever 44 is connected at the opposite end by linkage members 43 to the valve plunger 31.

The lever 40 is further connected through linkage member 46 to an arm 47 fixedly connected to a rockshaft 49 journaled in a bearing 51, carried by the housing 39. The latter linkage arrangement is freely movable in a chamber 48 formed in the housing 39. The rockshaft 49 is adapted to receive at the opposite end an apertured end portion 52 of a lever 53 which is suitably fastened thereto. The lever 53 is positioned in a second chamber 54 formed in the housing 39. The lever 53 is operatively connected through a reciprocable element 56, to a slack diaphragm 57 and a pressure responsive membrane, bellows or diaphragm element 63.

Figure 4:
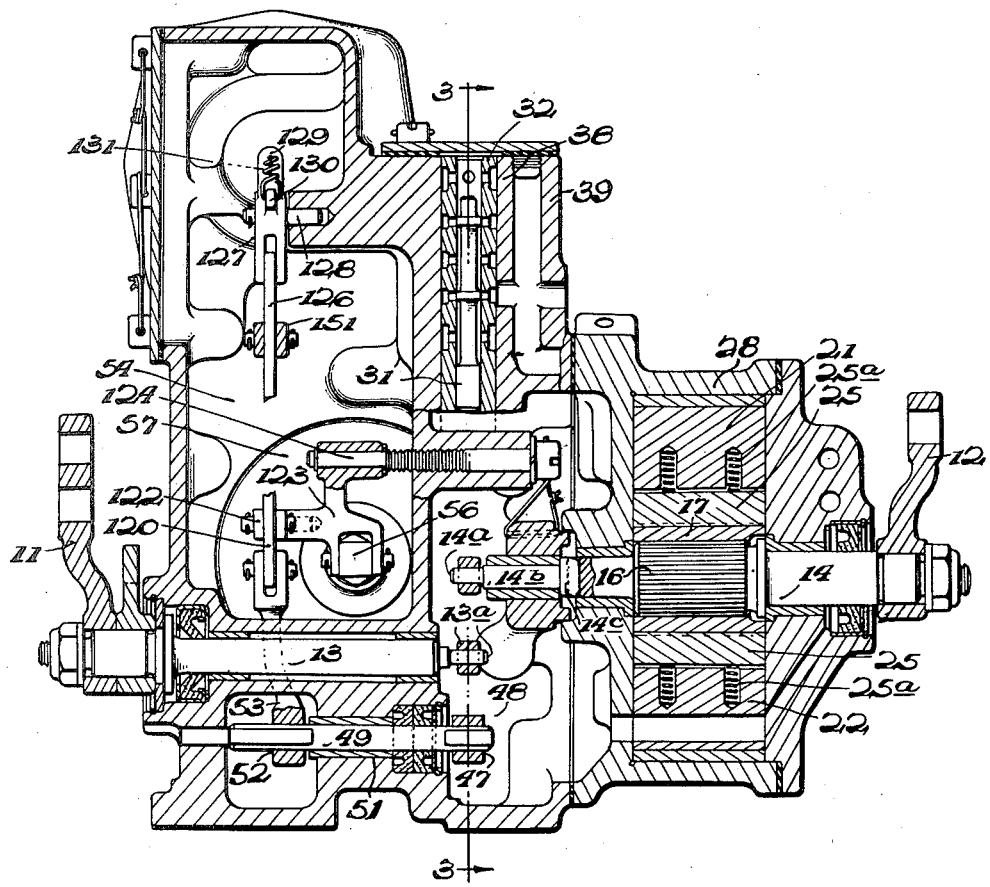
Figure 4 is a sectional view of Figure 2 taken along the lines 4—4.

The lever 44 previously noted is fulcrumed on a pin 14a provided at the end of a shaft 14b. The shaft 14b is connected by a key 14c to the shaft 14, as shown in Figures 4 and 7. The pin portion 14a is positioned in eccentric relation to the axis of rotation of the shaft 14 and 14b.

The link 44 is so pivotally mounted on the inner pin portion 14a that the link 44 will swing in response to rotation of shaft 14—14b; but the pin and link 44 are not rigidly fastened, one to the other, as the link 44 can also be swung by movement of the link 41, even though the shaft 14—14b and inner pin portion 14a of the shaft 14b are held stationary by the balanced pressures acting upon opposite sides of vane 16.

The same is true of the connection between the inner pin portion 13a of the shaft 13 and the arm 40. Thus, movement may be imparted to the arm 40 connecting links 41 and 46 by movement of the eccentric pin portion 13a and also by independent movement of links 41 and 46 effected through operation of the pressure responsive element 63.

The lever 53, as will be explained hereinafter, has an operative linkage connection with the outer end of a reciprocable element 56 constituting part of the pressure responsive diaphragm assembly whose flexible membrane or diaphragm element is shown at 63. The diaphragm assembly also includes a centrally bored and threaded plate 58 (Figure 2) with which the corresponding threads 59 of the member 56 have operative engagement. A nut 61 is also threadedly engaged with the member 56 and serves to clamp the flexible diaphragm 57 to the member 58 at the central portion of the diaphragm. Attached to the plate 58 at its periphery is the flexible corrugated bellows 63 whose opposite end is attached to the periphery of a plate 64 which is secured to the end surface 66 of a bellows casing 39a, as indicated at 67 and 68. The member 63 thus constitutes a bellows adapted to be pre-evacuated, and a coiled compression spring 71 is mounted in the bellows to urge the plate 58 (and hence the diaphragm 57) in a rightward direction as viewed in Figure 7, thereby opposing the collapsing tendency of the evacuated bellows, and holding the latter in equilibrium. A screw 72 is provided for limiting movement of member 56 in response to expansion of the bellows 63 under the biasing force of the spring 71. The screw 72 projects through the housing wall 39 and may be adjusted from the exterior thereof upon removal of a cap 72a.

Oil or other liquid is provided for filling the space between the elements 63 and 58, on the one hand, and the inner surface of the slack diaphragm 57 on the other. This oil constitutes a dampening agency as well as constituting the means for transmitting to the bellows 63 the pressure being supplied to the diaphragm 57 by the fluid medium in the chamber 54 as will be explained. In other words, the pressure which opposes the spring 71 is transmitted by the slack diaphragm 57 directly to the oil in space 95, and from said oil the pressure is transmitted to the bellows 63. Hence the slack diaphragm 57 is not loaded in any way whatsoever, and serves merely to retain the oil in the space 95. Thus there is provided means for dampening the vibrating tendency (which is characteristic of a bellows of the type indicated at 63) which means at the same time serves to segregate the dampening liquid from the supply of fluid medium which is introduced to the chamber 54.

Figure 1:
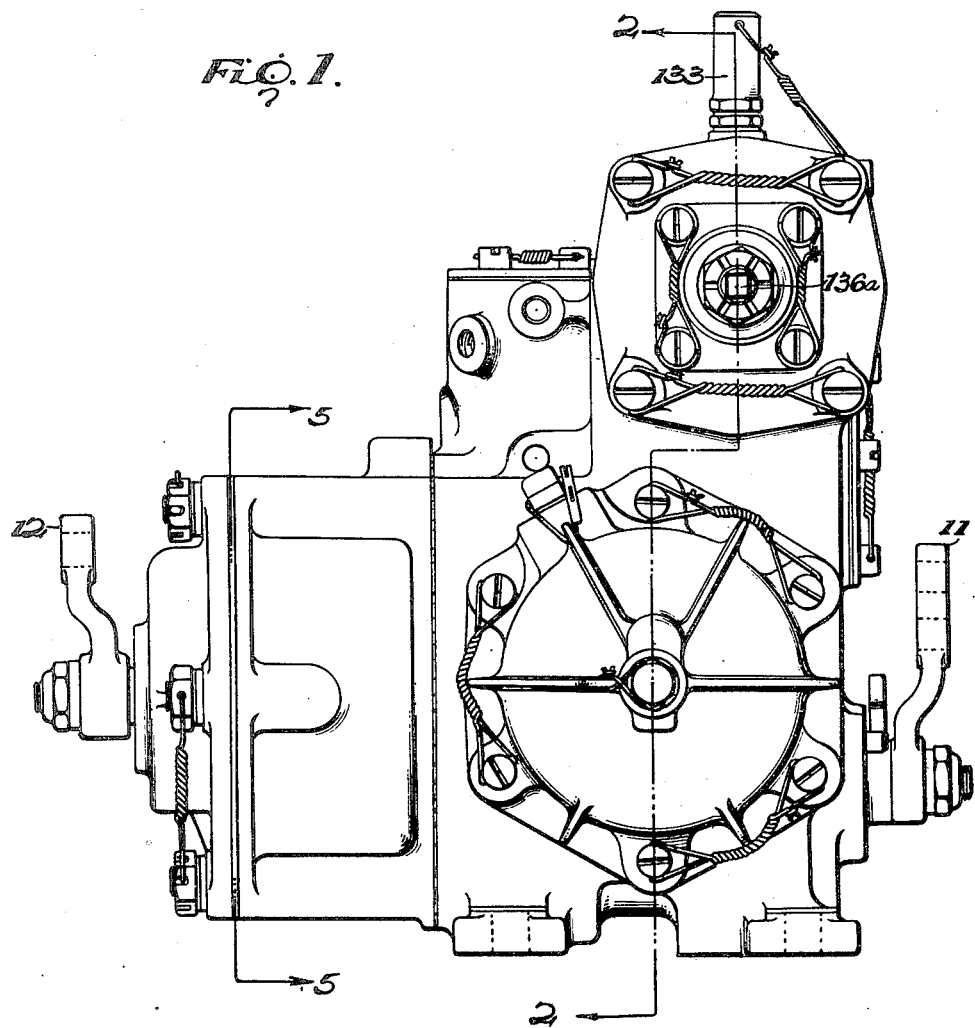
Figure 1 is a view in elevation of one form of the invention.
Figure 2:
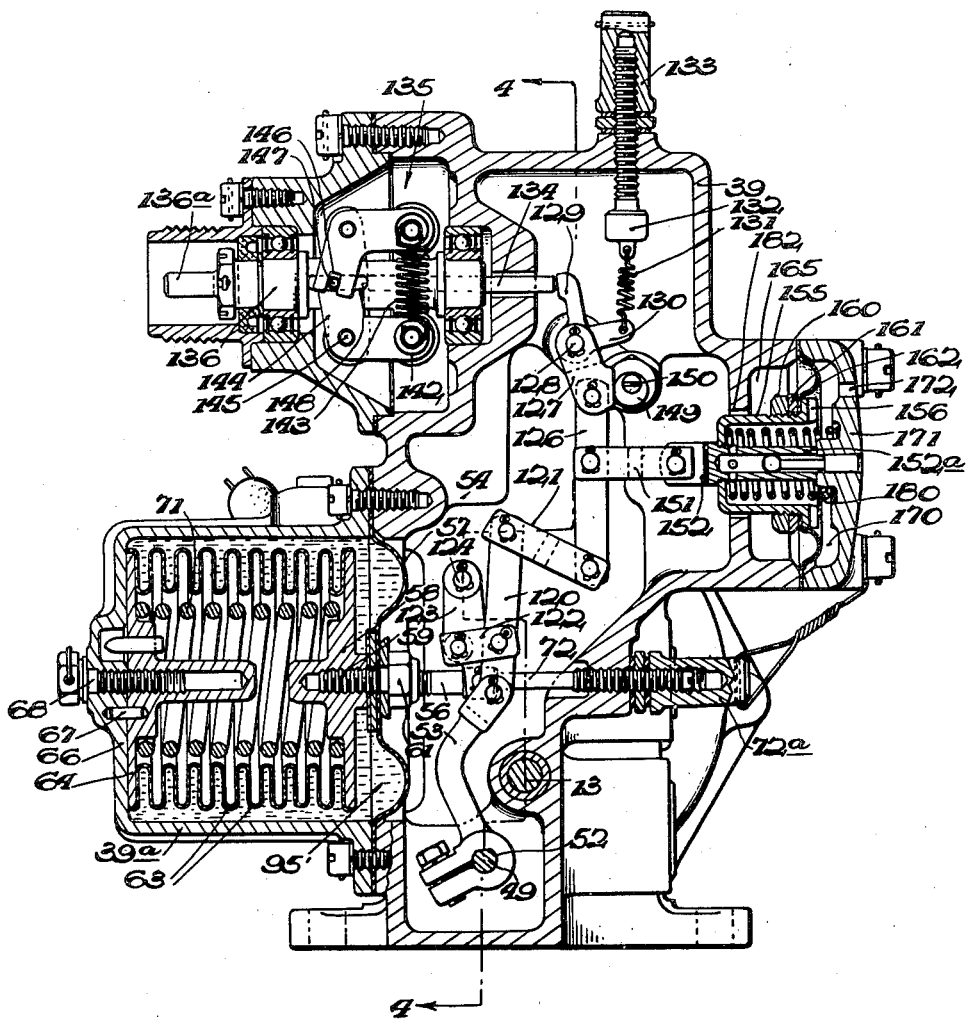
Figure 2 is a sectional view taken along the lines 2—2 of Figure 1.

In the present invention, as probably best shown in Figures 2, 4 and 7 the arm 53 is operably connected to the member 56 by means of a novel linkage arrangement. The latter arrangement includes a floating lever 120 pivotally connected at one end to the free end of the arm 53 and at the other end to a link 121.

The lever 120 has pivotally connected at a point intermediate the opposite ends thereof one end of a link 122. The link 122 is pivotally connected at the opposite end to a lever 123 at a point intermediate its opposite ends. The lever 123 has one end thereof pivoted on member 124 which projects into chamber 54 of the housing 39.

The opposite end of the lever 123 is pivotally connected to the member 56. Thus upon movement of the bellows 63 corresponding movement will be imparted to the arm 53 through the floating lever 120.

The link 121 previously described operably connects one end of the floating lever 120 to an end of a second floating lever 126. The opposite end of the floating lever 126 is pivotally connected to an arm 127 of a bell crank lever pivoted at 128 on a fixed pin carried by the casing 39 and positioned therein.

The bell crank lever has also provided arms 129 and 130. The arm 130 is operably connected at the end thereof to one end of a spring 131 fastened at the opposite end to a suitable adjustment screw 132 screw threadedly engaged in and projecting through the wall of the housing 39 into the chamber 54. The screw 132 may be conveniently adjusted for regulating the tension of the spring 131 from the exterior by removing a cover cap 133.

The spring 131 tends to bias the bell crank lever arm 129 in a counter clockwise direction, as viewed in Figures 2 and 7 so as to bias a pin 134 towards the left. The pin 134 is operably connected to an overspeed governor control indicated generally by the numeral 135.

The overspeed governor control 135 has a shaft 136, which is connected at 136a to a drive shaft 137, as shown schematically in Figure 8, connected through suitable transmission gearing to a drive shaft 138 of a supercharger 139. As is shown in Figures 8 and 10 the supercharger 139 is driven by an exhaust gas turbine 140 of a type well known in the art connected through a conduit 141 to the exhaust system of the aircraft engine.

The overspeed governor control 135 may be of conventional structure well known in the art including fly-balls 142 operably connected to the shaft 136 so that upon rotation of the shaft 136 the fly-balls 142 tend under centrifugal force to be biased outward against the biasing force of a spring 143. The fly-balls 142 may be mounted at the free outer ends of arms 144, which are pivotally connected at 145 to suitable projecting lugs affixed to the driven shaft 136.

The inner ends of the arms 144 have slots 146 in which is engaged a radially extending pin 147. The pin 147 is affixed to the pin 134 which is longitudinally movable in the driven shaft 136. The pin 147 is likewise movable in a longitudinal slot 148 provided in the driven shaft 136. The pin 147 moves in the slot 148 in response to movement of the arms 144 under centrifugal force acting on the fly-balls 142. Thus upon movement of the fly-balls 142 outwardly under centrifugal force the pin 134 is actuated through means of the arms 144 and pin 147 in a direction toward the right as viewed in Figures 2 and 7 biasing the arm 129 in a clockwise direction against the biasing force of the spring 131.

A cam 149 is adjustably affixed to the inner surface of the casing 39 by a screw 150. The cam 149 limits the movement of the arm 127 under the biasing force of the spring 131.

The floating lever 126 has pivotally connected thereto at a point intermediate the opposite ends thereof one end of a link 151. The opposite end of the link 151 is pivotally connected to a stem member 152 screw threadedly engaged in a cup shaped member 155 having a head portion 156. A nut member 160 is screw threadedly engaged on the outer side of the cup shaped member 155 and is arranged to clamp between the head portion 156 and a washer 161 a flexible diaphragm 162.

The flexible diaphragm 162 extends across a recess 165 provided in the casing 39 and a recess 170 formed in a cap member 171. The flexible diaphragm 162 is fastened between the cap member 171 and the casing 39.

A spring 180 is positioned between the cap 171 and the cup shaped member 155 biasing the cup shaped member 155 through an opening 182 extending from the recess 165 into the chamber 54 formed within the casing 39. The stem member 152 moves with the diaphragm 155 in response to the difference in the pressures acting at the opposite sides of the diaphragm 162. Atmospheric pressure is exerted upon the diaphragm 162 at the chamber 170 through a port 172 formed in the cap 171, while the pressure acting upon the diaphragm 162 at the opposite side will equal the fluid pressure exerted within the chamber 54, since the fluid medium within chamber 165 is affected thereby through passage 182.

A conduit 190 leads into the interior of the chamber 54 from the air inlet conduit 191 for the carburetor as shown in Figure 8 or as shown in Figure 10 a conduit 190a may lead into chamber 54 from the exhaust conduit 141 of the engine.

Thus the pressure in the chamber 54 will vary in accordance with the pressure of the air supplied the aircraft engine through the supercharger 139, which pressure may be effected by changes in the surrounding atmospheric pressure due to the changes in the altitude of the aircraft or may vary due to other operating conditions of the aircraft engine.

It will be seen that the fluid pressure within the chamber 54 which opposes the spring 71 of the bellows 63 constitutes in conjunction with said spring one of the operating means for the valve 31 shifting linkage 56, 123, 122, 120, 53, 49, 47, 46, 40, 41, 44 and 43. Hydraulic fluid may be supplied the valve 31 by means of a pump (not shown) operated by suitable driving means. The said fluid medium under pressure is adapted to be supplied to the chambers 23 and 24 of the servo unit under control of the movable plunger 31 of the valve assembly, which plunger is in turn under the control of the linkages 47, 46, 40, 41, 44, and 43 provided in the chamber 48.

The linkage 46 as previously indicated is operably connected to one end of the rockshaft 49, which is in turn connected at the opposite end to the lever 53 movably mounted in the chamber 54. The lever 53 is operably connected to the reciprocable member 56 and is urged in one direction by the pressure of the spring 71 upon the elements 58 and 57, and in the opposite direction by the pressure of a fluid medium supplied to the chamber 54 by way of a conduit shown at 190 in Figures 6 and 8 or conduit 190a in Figure 10, which conduit may be connected at its opposite end as previously indicated.

Figure 7 shows diagrammatically the manner in which the shifting of the plunger 31 of the valve assembly operates to supply fluid to one side or the other of the servo-motor 16 of Figure 7, while at the same time permitting an exhaust of operating fluid from the opposite side thereof; the conduits connecting the valve chamber with the chambers 23, 24 of the servo unit being indicated at 97 and 98 respectively, and the supply conduit at 99, while the two exhaust ("drain") passages are indicated at 101 and 102, the former being the exhaust passage when chambers 24 are being evacuated by way of conduit 98, and the passage 102 being the exhaust passage when the chambers 23 are being evacuated by way of conduit 97.

In the operation of the regulator in a system such as shown in Figures 8 and 10, the valve plunger 31 in normal operation will remain in the neutral position so long as the waste gate setting of Figures 8 or 10 is correct for maintenance of the desired pressure in the engine intake 191 or exhaust system 141 of the engine respectively, at the engine loading and altitude concurrently prevailing. When engine loading or altitude changes, however, the said pressure will change correspondingly. If the pressure increases the pressure in chamber 54 will increase correspondingly, as the chamber 54 is connected to one of the said systems as previously indicated. This pressure increase will cause displacement of the slack diaphragm 57, and the pressure thus exerted upon the interposed liquid 95 will cause a contraction of the bellows 63—the liquid itself being incompressible. The resulting contraction of the bellows 63 (axially) will cause member 56 of Figure 7 to shift to the left, and this will cause arm 53 to turn the rockshaft 49 in the bearing 51 in a counter-clockwise direction. This turning will move the linkage 47, 46, 40, 41, 44 and 43 and hence the valve plunger 31 will establish two parallel paths of flow; one path being from servomotor chamber 24 to the outlet 101 (Figure 7) and the other path being from pressure source 99 to the servo-motor chamber 23. The pressure thus exerted on vane 16 of the servo-motor will cause rotation of the shaft 14 in a counter-clockwise direction, as viewed in Figure 7, so as to effect through arm 12 a corresponding opening of the waste gate 12b, to effect a decrease in the controlled pressure in order to restore the same to the predetermined valve. Upon such rotation of shaft 14 a corresponding movement will be imparted to shaft 14b and eccentric pin 14a, causing the shaft 14b and pin 14a to move in a counter-clockwise direction as viewed in Figure 7 due to the eccentricity of the pin portion 14a of the shaft 14b in relation to the axis of rotation of the shaft 14b. Such movement of the pin 14a will cause the link 44 to swing on its pivotal connection to the link 41 in a clockwise direction so as to tend to lower valve plunger 31 to the neutral position, which together with an expansion of the diaphragm 57 to the right due to decrease in the controlled pressure will effect a return of the valve 31 to a neutral position. The action of the pin 14a thus tends to anticipate the change in pressure effected by the adjustment of the arm 12 and provides a "follow-up" arrangement which gives stability to the control device. When the controlled pressure drops below the predetermined point, the bellows 63 will expand to shift member 56 to the right as viewed in Figure 10, and the linkage will then cause valve plunger 31 to move to a lower position. Again two parallel paths of flow will be established, but this time they will operate to swing vane 16 in the opposite or clockwise direction, as viewed in Figure 7 thus shifting the arm 12 oppositely to the direction heretofore referred to so as to increase the controlled pressure. The "follow-up" action of the pin 14a moving in a clockwise direction will actuate link 44 so as to tend to again restore the valve 31 to a neutral position when the controlled pressure has been restored to normal.

Likewise upon manual adjustment of the lever 11 there will be imparted a movement to the eccentric inner pin portion 13a of the shaft 13, which as previously explained will cause the link 40 horizontally connecting the links 46 and 41 to swing in such a manner as to pivot on its connection to the link 46 so as to move the linkages 41, 44, 43 and hence the valve plunger 31 in a direction to effect an adjustment of the throttle or waste gate setting. The latter movement will also effect an adjustment of the value of the controlled pressure setting at which the bellows 57 will adjust the valve plunger 31 to a neutral position.

Thus it will be seen that by adjusting the lever 11 in a counter-clockwise direction as viewed in Figure 7, the pin 13a will move about the axis of rotation of the shaft 13 and thus the fulcrum point of the lever 40 will be adjusted causing a clockwise movement of the lever 40 about its pivotal connection to the link 46. Such movement of the lever 40 will impart a downward movement to the link 43 and valve 31. Thus operation may be effected of the arm 12 in a clockwise direction for increasing the controlled pressure by an appropriate adjustment for example of the waste gate 12b of Figure 8 for closing the waste gate 12b increasing the driving speed of the supercharger.

It will be further seen that by changing the fulcrum point of the lever 40 by the aforenoted adjustment of the pin 13a, the determined pressure setting to be maintained by the diaphragm 57 is increased.

Likewise the determined pressure setting to be maintained by the diaphragm 57 may be decreased by moving the lever 11, as viewed in Figure 7, so as to adjust the eccentric pin 13a in a clockwise direction about the axis of rotation of the shaft 13 and thus the fulcrum point of the lever 40 so as to move the link 40 in a counter-clockwise direction about its pivotal connection to the link 46.

The follow-up action of the pin 14a, previously described, will of course upon rotation of the shaft 14b in response to adjustment of the shaft 13 and eccentric pin 13a tend to restore the valve plunger 31 to a neutral position. The pin 14a is arranged so as to have eccentricity somewhat less than the eccentricity of the pin 13a.

If the pin 14a is provided with an eccentricity too great with relation to the pin 13a, the action of the eccentric pin 14a will tend to over power the operation of the pressure responsive diaphragm 57. Therefore in order to assure a proper follow-up action by the pin 14a, the pin 14a is provided with an eccentricity somewhat less than that of the pin 13a, and preferably the eccentricity of the pin 14a is from ten to forty percent of the eccentricity of the pin 13a depending upon the degree of follow-up desired. Further in order to assure the ready adaptability of the device to varying operating conditions the housing member 28 of the servo mechanism shown in Figure 5, is adapted to be removed from the main housing 39, as shown in Figure 6, so that the shaft 14b and its eccentric pin 14a may be removed and a shaft 14b having an eccentric pin 14a with more or less eccentricity readily interchanged therefor.

In addition to the action of the bellow assembly 63 upon the arm 53 as described the arm 53 is also controlled through the connecting linkage 120, 121, 126, 127 and 129 by the overspeed governor 135. Thus upon the supercharger 139 being driven at a speed in excess of a predetermined rate the overspeed governor 135 driven thereby through the shaft 137 will actuate the pin 136 to the right as viewed in Figure 7 so as to actuate through the aforenoted linkage the arm 53 in a counter-clockwise direction. Actuation of the arm 53 in the latter direction will of course cause valve 31 to be moved upward and servo motor vane 16 moved in a counterclockwise direction opening the waste gate 12b and decreasing the driving speed of the supercharger 139.

The arm 53 is also controlled through the linkage 120, 121, 126, and 151 by the differential control diaphragm 162 so that upon the pressure of the fluid medium within the chamber 54 decreasing to a value within a predetermined differential above atmospheric pressure, the diaphragm 162 will move the stem 152 to the left as viewed in Figures 2 and 7 causing actuation of the arm 53 in a clockwise direction through the linkages 151, 126, 121, and 120. Such actuation of the arm 53 will of course cause movement of the valve 31 in a downward direction through the valve operating linkage, 49, 47, 46, 40, 41, 44 and 43. Such a movement of the valve 31 from a neutral position will cause the operation of the servo motor vane 16 in a clockwise direction tending to close the waste gate 12b and increasing the driving speed of the supercharger 139.

As shown in Figures 2 and 7, when the pressure witihn the chamber 54 is in excess of the predetermined minimum differential above atmospheric pressure an end portion 152a of the stem 152, as shown in Figure 2, contacts the inner surface of the cap 171 so as to limit the movement of the diaphragm 162 and stem 152 in the opposite direction.

Figure 9:
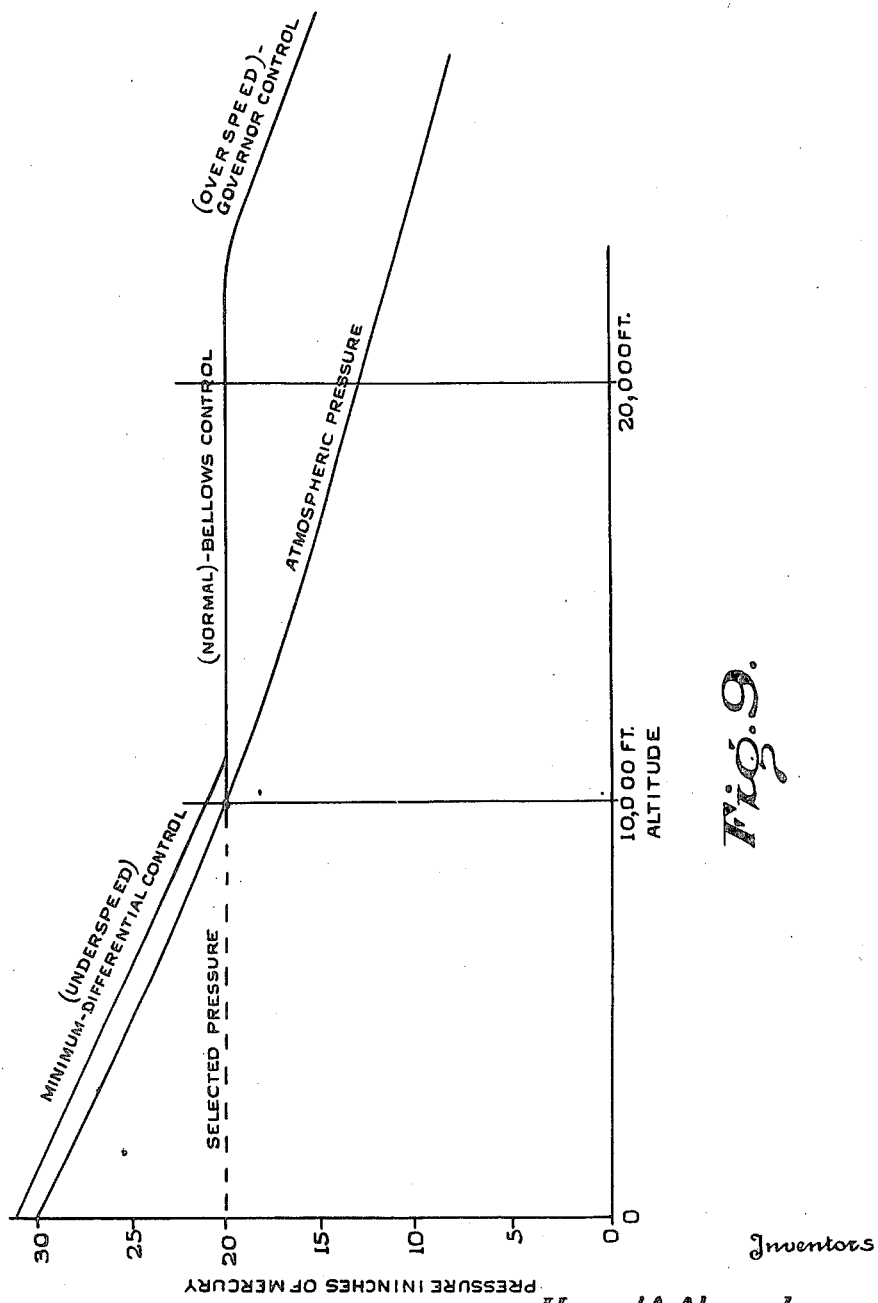
Figure 9 is a chart graphically illustrating the mode of operation of the invention.

Through this latter novel arrangement the controlled pressure is maintained in excess of a predetermined minimum differential value above atmospheric pressure. Thus, in case a pressure is selected through operation of the lever 11 which may be less than the surrounding atmospheric pressure it will be readily seen that unless such a minimum differential control means were provided the supercharger would stop running, since the pressure of the atmosphere would satisfy the requirements of the control diaphragm 57. However, with the latter novel minimum differential control the supercharger would be kept running in order to maintain a minimum pressure in excess of atmospheric pressure so as to maintain sufficient air flow for cooling portions of the turbine 140 and bearings as previously explained. The latter operation is indicated diagrammatically in Figure 9.

Figure 3:
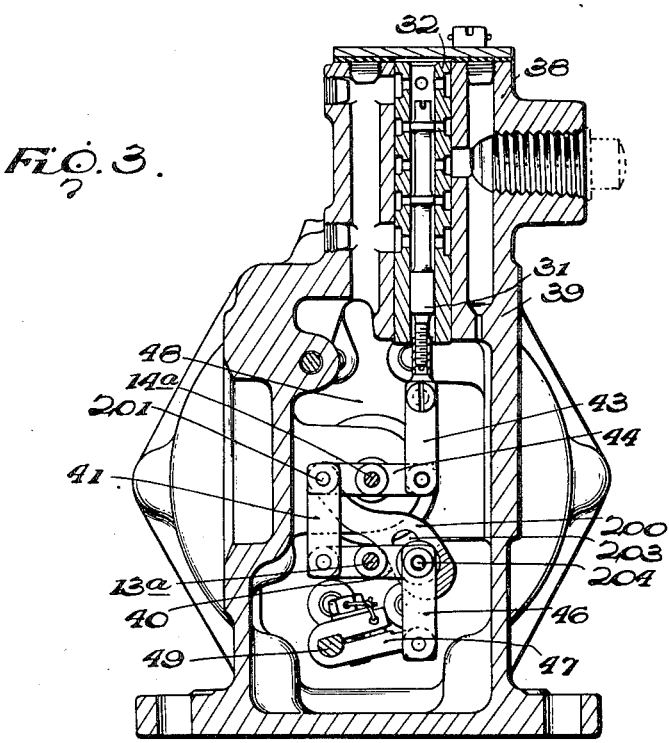
Figure 3 is a sectional view of Figure 4 taken along the line 3—3.

In order to move the servo motor 16 to the full decrease position and to block out of operation differential diaphragm 162 and pressure responsive diaphragm element 63 when the selector arm 11 is within 5 degrees of the full decrease position, there is further provided a novel low boost lock-out link indicated in Figures 3 and 7 by the numeral 200. One end of the link 200 is pivotally connected through a bolt 201, to one end of the link 44 and link 41. The bolt 201 as shown in Figures 3 and 7 also connects the links 44 and 41.

The opposite end of the link 200 has formed therein a longitudinal slot 203 in which is positioned a bolt 204. The bolt 204 pivotally connects the links 40 and 46 and the link 200. There is thus provided a low boost lock-out which is controlled by the slotted link 200 connected across the two bolts 201 and 204 of the linkage 40 and 41 provided at the selector eccentric 13a.

Thus, when the selector arm 11 is in the lockout range, that is the range immediately preceding the full decrease pressure position in which range it is desirable for purposes of safety to have manual control of the device in a pressure decreasing direction, the cross link 200 locks the valve linkage 40 and 41 and prevents the minimum differential diaphragm 162 or bellows 63 from controlling the servo valve 31. In doing so, the lever 127 loaded by the resilient means or spring 131 at the governor plunger 134 will be deflected from the plunger 134 by the action of the link 151 moving to the left in response to the differential pressure action upon diaphragm 163, or upon action of the link 122 moving to the right in response to a decrease in the pressure acting within the chamber 54 upon bellows 63, as the lever 53 will be held from moving in a clockwise direction for increasing the controlled pressure due to the locking action of the link 200 on the link 46 and arm 52. Thus within the aforenoted boost lock-out range, the auxiliary supercharger is locked from operation for purposes of safety, through operation of the arm 11 by the waste gate 12b being adjusted to the full open position.

Although the present invention is only described and illustrated in detail for one embodiment thereof, it is to be expressly understood that the same is not limited thereto. Various changes may be made in design and arrangement of the parts illustrated, as will now be apparent to those skilled in the art. For a definition of the limits of the invention, reference should be had to the appended claims.

What is claimed is:

1. A control mechanism comprising, in combination, a first floating lever, a pilot valve connected to one end of said first floating lever, a second floating lever having one end operably connected to the other end of the first floating lever, a rotary control member, an eccentric pin provided at one end of said rotary member and pivotally supporting said second floating lever at a point intermediate the opposite ends thereof, a membrane responsive to changes in an operating condition, said membrane operably connected to the other end of said second floating lever, hydraulic motor means being operated by the pilot valve, a shaft driven by said motor means, means pivotally supporting said first floating lever at a point intermediate the opposite ends thereof, and a link connecting the other end of said second floating lever to the other end of said first floating lever so as to lock said membrane from operative relation with said pilot valve under predetermined operating conditions.

2. A control mechanism comprising, in combination, a floating lever, control means operably connected to one end of said floating lever, a membrane responsive to changes in an operating condition, means operably connecting said membrane to the other end of said floating lever, and a link connected between said control means and said membrane and across said floating lever for placing said membrane out of operating relation with said control means under predetermined operating conditions.

3. A control mechanism comprising, in combination, a lever, a servomotor system operatively controlled by said lever, a pressure responsive member operatively connected to said lever for controlling said system, means operatively connected to said lever for manually controlling said system, and linkage means connected across said lever and operable at a predetermined value of said pressure to lock said pressure responsive member from control of said system.

4. A control mechanism comprising, in combination, a lever, a servomotor system operatively controlled by said lever, a first pressure responsive member operatively connected to said lever for controlling said system, a second differential pressure responsive member operatively connected to said lever for controlling said system, linkage means connected across said lever and operable at a predetermined value of said first pressure to lock said second differential pressure responsive member from control of said system.

5. A control mechanism comprising, in combination, a lever, a servomotor system operatively controlled by said lever, a first pressure responsive member operatively connected to said lever for controlling said system, a second differential pressure responsive member operatively connected to said lever for controlling said system, linkage means connected across said lever and operable by action of said first pressure responsive member to lock said members from control of said system, and manually operable means connected to said lever for controlling said system during the locking action of said linkage.

6. A control mechanism comprising, in combination, a servomotor system, means for controlling said servomotor system, a first floating lever, manually operable means connecting one end of said first floating lever to said control means, a second floating lever having one end operatively connected to the other end of the first floating lever, speed responsive means connected to said second floating lever at the other end thereof, a membrane responsive to changes in a first fluid pressure, said membrane operatively connected to said first floating lever at a point intermediate the opposite ends of said first floating lever, a second membrane responsive to the difference between the first fluid pressure and a second fluid pressure, said second membrane operatively connected to said second floating lever at a point intermediate the opposite ends of said second floating lever, and a linkage means connected across said means for connecting said first floating lever to said control means, said linkage means arranged to lock said pressure responsive membranes and speed responsive means from controlling said servomotor system during predetermined operating conditions.

7. A control mechanism comprising, in combination, a lever, a servomotor system operatively controlled by said lever, a first pressure responsive member operatively connected to said lever for controlling said system, a second pressure responsive member operatively connected to said lever for controlling said system, linkage means connected across said lever and operable at a predetermined value of said first pressure to lock said second pressure responsive member from control of said system, and resilient means for permitting said second pressure responsive member to move freely during the locking action of said linkage.

8. A control mechanism comprising, in combination, a lever, a servomotor system operatively controlled by said lever, a first pressure responsive member operatively connected to said lever for controlling said system, a second differential pressure responsive member operatively connected to said lever for controlling said system, linkage means connected across said lever and operable by action of said first pressure responsive member to lock said members from control of said system, and manually operable means connected to said lever for controlling said system during the locking action of said linkage, and resilient means for permitting said members to move freely during the locking action of said linkage.

9. A control mechanism comprising, in combination, a lever, a servomotor system operatively controlled by said lever, a pressure responsive member operatively connected to said lever for controlling said system, means operatively connected to said lever for manually controlling said system, and linkage means connected across said lever and operable at a predetermined value of said pressure to lock said pressure responsive member from control of said system, and resilient means for permitting said pressure responsive member to move freely relative to said lever during the locking action of said linkage.

10. A control mechanism comprising, in combination, a servomotor system, means for controlling said servomotor system, a first floating lever, connecting means for connecting one end of said first floating lever to said control means, a second floating lever having one end operatively connected to the other end of the first floating lever, speed responsive means, and spring biased lever means connecting said speed responsive means to the other end of said second floating lever, a first membrane responsive to changes in a first fluid pressure, said first membrane operatively connected to said first floating lever at a point intermediate the opposite ends of said first floating lever, a second membrane responsive to the difference between the first fluid pressure and a second fluid pressure, said second membrane operatively connected to said second floating lever at a point intermediate the opposite ends of said second floating lever, a linkage means arranged to lock said connecting means and said pressure responsive membranes and speed responsive means from controlling said servo motor system during predetermined operating conditions, and said spring biased lever means permitting said membranes to move freely during the locking action of said linkage means.

11. A control mechanism for an aircraft engine of the class including an intake system and an exhaust system; comprising, in combination, a control shaft for connection to a pilot's control lever, power means for affecting the pressure in one of said systems of the engine, means for operably connecting said control shaft to said power means, said connecting means including a floating lever, and an eccentric means directly connecting said shaft to said floating lever; a boost control connected to said floating lever and arranged to control said power means so as to maintain the pressure in said one system of the engine at a selected value, said eccentric means arranged to change such selected value upon adjustment of said shaft, and means connected across said floating lever and operable upon variance of said pressure to a predetermined value to lock said boost control out of operative relation with said power means.

12. A control mechanism for an aircraft supercharger, comprising, in combination, a servomotor system for controlling the driven speed of the supercharger so as to normally provide a definite selected fluid pressure, means for controlling said system, a first floating lever, said control means connected to one end of said first floating lever, a second floating lever having one end operably connected to the other end of the first floating lever, means pivotally supporting said second floating lever at the other end, a first membrane responsive to changes in the controlled fluid pressure, said first membrane operatively connected to said first floating lever at a point intermediate the opposite ends of said first floating lever, a second membrane responsive to the difference in pressure between the controlled fluid pressure and the prevailing atmospheric pressure, said second membrane operatively connected to said second floating lever at a point intermediate the opposite ends of said second floating lever for effecting control of said servomotor system upon a predetermined differential between said controlled fluid pressure and the prevailing atmospheric pressure.

13. A control mechanism for an aircraft supercharger, comprising, in combination, a servomotor system for controlling the driven speed of the supercharger so as to normally provide a preselected fluid pressure, means for controlling said system, a first floating lever, said control means connected to one end of said first floating lever, a second floating lever having one end operatively connected to the other end of the first floating lever, a membrane responsive to changes in the controlled fluid pressure, said membrane operatively connected to said first floating lever at a point intermediate the opposite ends of said first floating lever, means responsive to the driven speed of said supercharger and operatively connected to said second floating lever at the other end thereof for effecting control of said servomotor system upon predetermined speed conditions, and another membrane responsive to the difference in pressure between the controlled fluid pressure and the prevailing atmospheric pressure and operably connected to said second floating lever at a point intermediate the opposite ends thereof.

14. A control mechanism for an aircraft supercharger, comprising, in combination, a servomotor system for controlling the driven speed of the supercharger so as to normally provide a preselected fluid pressure, means for controlling said system, a first floating lever, said control means connected to one end of said first floating lever, a second floating lever having one end operatively connected to the other end of the first floating lever, a speed responsive means operatively connected to the other end of said second floating lever, a first membrane responsive to changes in the controlled fluid pressure, said first membrane operatively connected to said first floating lever at a point intermediate said opposite ends of said lever, a second membrane responsive to the difference in pressure between the controlled fluid pressure and the prevailing atmospheric pressure, said second membrane operatively connected to the second floating lever at a point intermediate the opposite ends of said second floating lever, whereby control of said servomotor system may be effected through operation of said speed responsive means and said pressure responsive membranes.

15. A control mechanism for an aircraft supercharger, comprising, in combination, a servomotor system for controlling the driven speed of the supercharger so as to normally provide a preselected fluid pressure, means for controlling said system, a first floating lever operatively connected to said control means; a second floating lever operatively connected to the first floating lever; a membrane responsive to changes in the controlled fluid pressure, said membrane operatively connected to said first floating lever; means responsive to the driven speed of said supercharger and operatively connected to said second floating lever for effecting control of said servomotor system to prevent the speed of the supercharger from exceeding a predetermined maximum value; and another membrane responsive to the difference in pressure between the controlled fluid pressure and the prevailing atmospheric pressure and operatively connected to said second floating lever for effecting an overriding control of said servomotor system to maintain the controlled fluid pressure in excess of atmospheric pressure by a predetermined value, said other membrane so arranged that said controlled fluid pressure normally maintains said membrane in an inoperative relation, and said membrane effecting said overriding control only when the difference between the controlled fluid pressure and the prevailing atmospheric pressure is less than said predetermined value.

16. In an internal combustion engine of the class including an intake system and an exhaust system, a supercharger operatively associated with said intake system, means for driving said supercharger, means for controlling the driven speed of said supercharger, motor means for operating said control means, means for controlling operation of said motor means, first means responsive to the pressure in one system for operating said motor control means so as to normally maintain a preselected pressure in said one system; the improvement comprising a second overspeed responsive means driven by said driving means for operating said motor control means in such a manner as to prevent said supercharger from being driven at a speed in excess of a predetermined maximum value, third means independent of said first means and responsive to the difference between the pressure in said one system and the pressure of the prevailing atmosphere for effecting an overriding control of said motor control means only upon said differential pressure decreasing below a predetermined minimum value so as to maintain a pressure in said one system in excess of atmospheric pressure, and floating lever means operatively interconnecting said first, second and third means to said motor control means.

HOWARD A. ALEXANDERSON.
HAROLD A. WHEELER.

REFERENCES CITED

The following references are of record in the file of this patent:

UNITED STATES PATENTS

| Number | Name | Date |
| --- | --- | --- |
| 1,310,683 | Sherbondy | July 22, 1919 |
| 1,346,563 | Sherbondy | July 13, 1920 |
| 1,557,793 | Berger et al. | Oct. 20, 1925 |
| 2,020,847 | Mitereff | Nov. 12, 1935 |
| 2,024,202 | Berger | Dec. 17, 1935 |
| 2,088,954 | Gregg | Aug. 3, 1937 |
| 2,148,230 | Berger | Feb. 21, 1939 |
| 2,208,554 | Price | July 16, 1940 |
| 2,305,070 | Butler et al. | Dec. 15, 1942 |
| 2,359,615 | Browne et al. | Oct. 3, 1944 |
| 2,373,139 | Morris | Apr. 10, 1945 |
| 2,376,199 | Shoults | May 15, 1945 |